Jan. 8, 1924. 1,479,998
J. R. McCONNELL
METHOD OF AND APPARATUS FOR TREATING FILTERING MATERIALS
Filed June 8, 1922
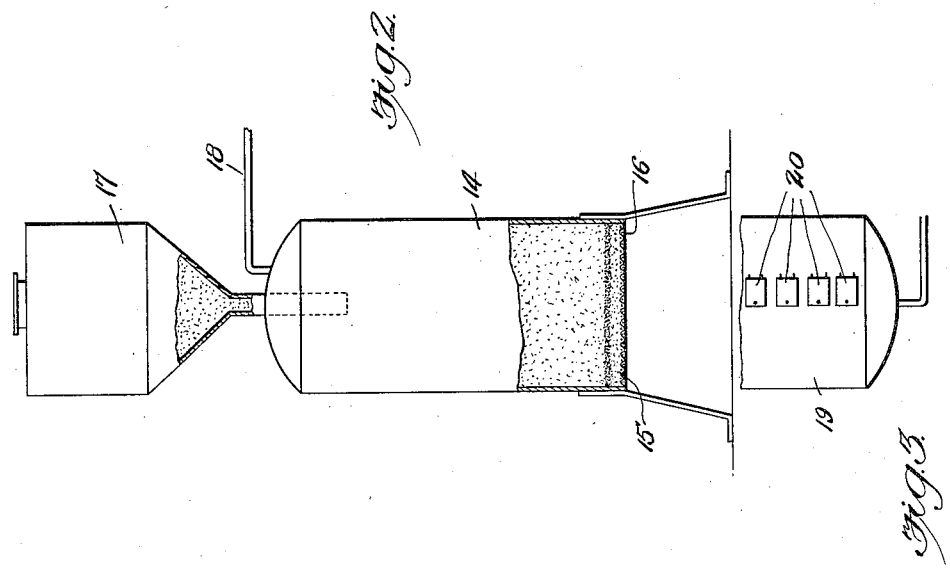
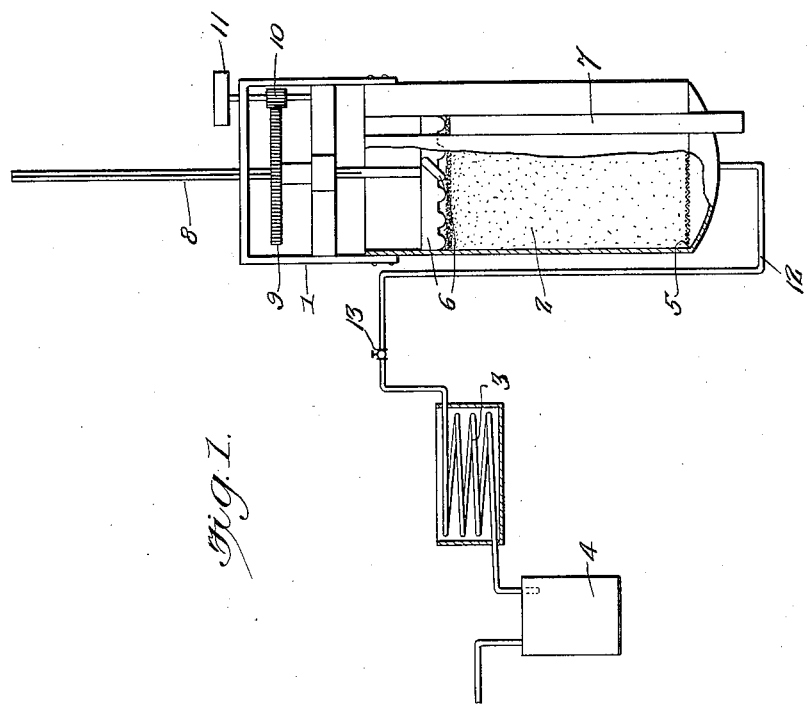
Inventor
J. R. McConnell,
By Ivan P. Tashof
Attorney Patented Jan. 8, 1924.

1,479,998

UNITED STATES PATENT OFFICE.

JOHN ROBERT McCONNELL, OF WARREN, PENNSYLVANIA.

METHOD OF AND APPARATUS FOR TREATING FILTERING MATERIALS.

Application filed June 8, 1922. Serial No. 566,895.

*To all whom it may concern:*

Be it known that I, JOHN R. McCONNELL, a citizen of the United States, residing at Warren, in the county of Warren and State of Pennsylvania, have invented certain new and useful Improvements in Methods of and Apparatus for Treating Filtering Materials, of which the following is a specification.

My invention relates to the revivification of filtering materials, particularly clay.

Fresh clay, usually comes from the mines partially dried. At the refinery it is further dried by heating to about 600° F. in the presence of air, by either being passed through a rotary kiln or a fire brick retort, the latter by gravity. An intense flame is required to do this heating, either natural gas or oil being employed.

After this first burning the clay is used for filtering dark oils. When the clay will no longer impart a good color to the oil, that is, its filtering property has become temporarily exhausted, it is washed with gasoline, to free it of the oil and then steamed for a suitable length of time to remove the gasoline. The gasoline resulting from the steaming process is passed through a cooler and back to the supply tank. After all gasoline has been removed by steaming, as shown by testing the steam coming through the cooler, the retort bottom of the filter is opened and the dry clay removed. After the clay has again been used as a filter medium, it is again steamed and roasted in the rotary kiln or fire brick retort. This is continued until the clay has no more filtering property and may be repeated 15 or 20 times. Sometimes the clay is used as high as 20 times, usually from 8 to 10. Each time it is used it becomes more impregnated with carbon, which stops up the pores of the clay interfering with its filtering property. The intense heating also has the faculty of fusing the clay thus closing the pores. The roasting process above described requires a severe artificial heating of the clay.

I have discovered that if the used clay is brought in contact with oxygen at a high enough temperature, it may be roasted without the use of extraneous fuel other than that used for initiating combustion by applying a flame to the top surface of the clay whereby the carbon contained therein is brought to a state of combustion and substantially flameless combustion is initiated throughout the clay-mass, the velocity of propagation, of course, varying somewhat in different cases. Expressed in a little different language, the used clay is able to burn itself by virtue of the carbon contained therein, and one section in burning brings the adjacent section to a kindling temperature whereby the combustion progresses uniformly through the mass.

For a full understanding of my method of treating clay and apparatus therefor, reference is directed to the accompanying drawing, more or less diagrammatic, in which:

Fig. 1, is a side view partly in section of an oxidation retort provided with a sliding door for the removal of revivified clay.

Fig. 2, is a similar view without the sliding door, the direction of propagation of the combustion being, however, reversed.

Fig. 3, is a modification of the retort shown in Fig. 1, the sliding door being replaced by a series of doors.

The apparatus as shown in Figure 1 comprises a retort 1 partially filled with clay 2, a condenser 3 and a tank 4 all in operative connection. The retort is provided with a screen 5, stirring blades 6 and a sliding door 7. The stirring blades 6 are carried by a grooved shaft 8, thereby allowing the blades to follow the clay-level as the latter recedes towards the bottom of the retort. The shaft 8 may be rotated by any suitable means. For example, the shaft may be provided with a gear 9, meshing with pinion 10 actuated by driving pulley 11. The suction conduit 12 which is connected to the lower portion of the retort 1 and to the condenser 3 carries a control valve 13.

The apparatus shown in Figure 2 comprises a retort 14, carrying a filter screen 15, resting on an apertured removable bottom 16, to facilitate the removal of the revivified clay, a feeding device 17 and a suction conduit 18. The screen 15, is of larger mesh than the largest particle of clay. As long as the clay lies dormant it remains above the screen, but by jarring the bottom of the retort, the clay sieves through in a uniform stream. As shown in Fig. 3, the retort 19 may be provided with a series of doors 20 for removing the revivified clay. In apparatus of this character the stirring of the clay may be by hand.

In operation of the device set forth in Fig. 1, the retort 1 is filled to a suitable height with used clay. Suction is applied producing a gentle current of air through the column of clay 2. Thereafter a flame is played on the top surface of the clay column until the clay for a depth of about one eighth of an inch becomes red. The flame is then removed. The layer of clay heats the adjacent layer below and the propagation of the combustion continues until all the clay is revivified. Each layer of clay, as it becomes revivified, is removed through the sliding door 7. To prevent fusion, during heating the hot clay-mass is stirred by stirrers 6. The carbon and asphaltic products retained in the clay, on combustion, furnish the heat necessary to roast the clay. The speed of burning may be regulated by the strength of the air current. The method of burning the clay by substantially flameless combustion whereby the propagation of the combustion through the clay-mass is controlled, results in an evenly burned clay and tends to prevent the fusion of the clay and the consequent closing of the pores.

Instead of burning the clay from the top towards the bottom, the direction of burning may be reversed and the apparatus shown in Fig. 2 is preferably employed. The clay is fed through the feeding device 17, and the flame is applied through the filter screen 15 and the apertured bottom 16. Suction is applied at the top of the retort 14. Any suitable means may be employed to remove the layer of purified clay. For example, it may be removed by means of a bottom or side retort-door.

Instead of suction, a forced draft may be used, but the latter is more difficult to apply successfully and my best results have been obtained employing the former.

My method of revivification can be successfully applied to any filtering medium containing a combustible element, distributed among the relatively inert non-combustible material of the filtering medium. It is particularly suitable for fuller's earth. Certain shales, particularly those from California, after treatment for the production of oil, contain a large amount of carbonaceous material. This carbon may be removed by the method set forth and the filtering property of the resulting material approaches that of fuller's earth.

New clay may be burned by my method by first thoroughly mixing it with clay containing carbon. For example, clay used two or three times, mixed with fifty per cent new clay enables the new clay to be thoroughly burned.

I am aware of the disclosure of U. S. Patent No. 804,016 to Latting. In the Latting process, extraneous fuel is employed and the idea of progressively burning the carbon compounds in the clay is absent.

Proceeding according to my process both volatile and non-volatile carbonaceous matter present in the filtering material is substantially eliminated by a progressive burning out of the combustible matter without the use of fuel other than that used in initiating combustion, the material undergoing revivification being held stationary and in a position for progressive combustion from the heat generated by that portion of the material in a state of combustion. In my process it is the non-volatile matter present in the filtering material which is relied upon principally for furnishing the fuel for combustion. It is desired to indicate that it is intended that the expression "burning out combustible matter" used in the claims shall cover the substantially complete burning out of both the volatile and non-volatile carbonaceous material present in the medium undergoing revivification. My process contemplates a true revivification and this does not occur when only the volatile matter and perhaps a little carbon is combusted.

I claim:—

1. The method of revivifying filtering materials containing non-combustible and combustible matter without the use of extraneous fuel other than that used for initiating combustion comprising progressively burning out the combustible matter.

2. The method of revivifying filtering materials containing non-combustible and combustible matter without the use of extraneous fuel other than that used for initiating combustion comprising initiating combustion in one section thereof in the presence of a current of an oxygen supplying fluid and regulating the propagation of the combustion through the mass.

3. The method of revivifying filtering materials containing non-combustible and combustible matter without the use of extraneous fuel other than that used for initiating combustion comprising initiating combustion in one section thereof in the presence of a current of an oxygen supplying fluid at a pressure less than atmospheric.

4. The method of revivifying filtering materials containing non-combustible and combustible matter without the use of extraneous fuel other than that used for initiating combustion comprising initiating combustion in the filtering material at one section thereof in the presence of a current of an oxygen containing fluid, and removing the revivified section as the combustion progressively proceeds through the filtering material.

5. The method of revivifying filtering materials containing non-combustible and combustible matter without the use of extraneous fuel other than that used for initiating combustion comprising initiating combustion in one section thereof in the presence of a current of an oxygen containing fluid to burn the combustible matter in said section and bring the adjacent section to a kindling temperature and removing the revivified section as the combustion proceeds through the remaining filtering material.

6. The method of revivifying clay containing combustible matter without the use of extraneous fuel other than that used for initiating combustion comprising initiating combustion in one section thereof, in the presence of a current of an oxygen containing fluid to burn the combustible matter in said section and bring the adjacent section to a kindling temperature and removing the revivified section as the combustion proceeds through the remaining clay.

7. The method of preparing new clay for use as a filtering medium comprising mixing the new clay with used clay containing a considerable quantity of combustible matter, and burning the mixture without the use of any extraneous fuel other than that used for initiating combustion to produce a thoroughly roasted clay.

8. In apparatus for revivifying filtering materials, the combination of a retort adapted to hold a charge of used clay containing combustible matter, means for supplying an oxygen containing fluid to a clay-section to maintain therein the combustion initiated by the application of a flame, and to bring the adjacent section to a kindling temperature, means for stirring the uppermost clay-section to prevent fusion of the clay, and means adapted to permit the removal of a revivified clay section without substantially interfering with the combustion in the adjacent clay section.

9. The method of revivifying spent mineral filtering materials containing combustible matter comprising progressively burning out the combustible matter without the use of extraneous fuel other than that used in initiating combustion.

10. The method of revivifying spent mineral filtering material containing combustible matter without the use of extraneous fuel other than that used for initiating combustion which comprises igniting the combustible matter in a portion of the material, and propagating combustion through the remainder of the material by supplying a combustion supporting gas thereto.

11. The method of revivifying filtering material containing non-combustible and volatile and non-volatile combustible matter without the use of extraneous fuel other than that used for initiating combustion comprising progressively burning out the volatile and non-volatile combustible matter to substantially combust the latter and thereby produce a completely revivified filtering material.

12. The method of revivifying filtering material containing non-combustible and volatile and non-volatile combustible matter without the use of extraneous fuel other than that used for initiating combustion comprising igniting the volatile and non-volatile combustible matter in a portion of the material, and propagating combustion through the remainder of the material by supplying a combustion supporting gas thereto whereby the non-volatile matter is substantially all eliminated and a completely revivified filtering material obtained.

13. The method of revivifying filtering material containing non-combustible and volatile and non-volatile combustible material without the use of extraneous fuel other than that used for initiating combustion comprising igniting the volatile and non-volatile combustible matter in a portion of the material, and propagating combustion through the remainder of the material, the whole mass, other than the surface layer thereof, being held in a stationary position, by supplying a combustion supporting gas thereto whereby the non-volatile matter is substantially all eliminated and a completely revivified filtering material obtained.

14. The method of revivifying spent filtering material containing non-combustible and volatile and non-volatile combustible matter by progressively burning out the latter without the use of extraneous fuel other than that used in initiating combustion comprising passing a current of oxygen supplying fluid through the filtering material, the major portion of which is held in a stationary condition and agitating the immediate section undergoing combustion while holding the entire mass in a position for progressive combustion from the heat generated by the filtering material already in a state of combustion.

In testimony whereof I hereunto affix my signature.

JOHN ROBERT McCONNELL.